US010339973B2

(12) United States Patent
Jin et al.

(10) Patent No.: US 10,339,973 B2
(45) Date of Patent: Jul. 2, 2019

(54) SYSTEM AND METHOD FOR AUDIO DUBBING AND TRANSLATION OF A VIDEO

(71) Applicant: INTERNATIONAL BUSINESS MACHINES CORPORATION, Armonk, NY (US)

(72) Inventors: Yuan Jin, Shanghai (CN); Cheng Yu Peng, Shanghai (CN); Yin Qian, Shanghai (CN); Xiao Rui Shao, Shanghai (CN); Jian Jun Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/430,997

(22) Filed: Feb. 13, 2017

(65) Prior Publication Data

US 2018/0232363 A1 Aug. 16, 2018

(51) Int. Cl.
*G11B 27/031* (2006.01)
*G06F 17/27* (2006.01)
(Continued)

(52) U.S. Cl.
CPC ........ *G11B 27/031* (2013.01); *G06F 17/2795* (2013.01); *G06F 17/289* (2013.01); *G06K 9/00335* (2013.01)

(58) Field of Classification Search
CPC . G11B 27/031; G06F 17/289; G06F 17/2795; G10L 15/02; G10L 15/25; G10L 2015/027
(Continued)

(56) References Cited

U.S. PATENT DOCUMENTS 5,907,351 A * 5/1999 Chen ...................... H04N 7/142
345/473
6,492,990 B1 12/2002 Peleg et al.
(Continued)

FOREIGN PATENT DOCUMENTS

CN 104574478 4/2015
JP H086182 1/1996

OTHER PUBLICATIONS

Morishima, Shigeo et al.; Multimodal Translation System Using Texture-Mapped Lip-Sync Images for Video Mail and Automatic Dubbing Applications; EURASIP Journal on Applied Signal Processing; vol. 11; Sep. 2, 1004; pp. 1637-1647.
(Continued)

*Primary Examiner* — Bharatkumar S Shah
(74) *Attorney, Agent, or Firm* — Schmeiser, Olsen & Watts, LLP; William Hartwell

(57) ABSTRACT

The present invention provides a method and system for converting a first language of a soundtrack of a person speaking in a video to a second language. The method defines an outline of a shape of a mouth opening of the person speaking a syllable of a word of the first language in the video at a given start time by selecting a predetermined number of points along a border of the mouth opening defined by the lips. A length of the spoken syllable is also measured and one or more adjacent syllables are combined to create a word. The word is translated into synonym words in the second language, the best fit synonym word is selected that most closely matches the mouth shape of the first language word, and a mouth shape adjustment script is applied to fine tune the mouth shape of the best fit synonym word.

20 Claims, 5 Drawing Sheets

(51) Int. Cl.
*G06F 17/28* (2006.01)
*G06K 9/00* (2006.01)
(58) Field of Classification Search
USPC .......................................................... 704/277
See application file for complete search history.

(56) References Cited

U.S. PATENT DOCUMENTS

| | | |
|---|---|---|
| 8,655,152 B2 | 2/2014 | Marks et al. |
| 9,094,576 B1 | 7/2015 | Karakotsios |
| 9,300,994 B2 | 3/2016 | Gerrity et al. |
| 2002/0089645 A1* | 7/2002 | Mason ................. G11B 27/036 352/36 |
| 2006/0204060 A1 | 9/2006 | Huang et al. |
| 2017/0031899 A1* | 2/2017 | Lee ..................... G06F 17/2836 |

OTHER PUBLICATIONS

JBI Studios; Dubbing & Voice-Over for Video; Retrieved from the Internet Feb. 10, 2017; URL: https://www.jbistudios.com/dubbing; 8 pages.

* cited by examiner

| WORD | ENGLISH | CHINESE TRANSLATION 1 | CHINESE TRANSLATION 2 | CHINESE TRANSLATION 3 |
|---|---|---|---|---|
| | WONDERFUL! | 很不错** | 太好了 | 好 |
| SYLLABLE 1 | ◇ | ◇ | △ | ○ |
| SYLLABLE 2 | ◇ | ◇ | ○ | ◇ |
| SYLLABLE 3 | ◇ | ◇ | ◇ | |

SYSTEM AND METHOD FOR AUDIO DUBBING AND TRANSLATION OF A VIDEO

TECHNICAL FIELD

The invention relates generally to the field of translating and dubbing an audio soundtrack from one language to another in a video, and in particular to a method and system for determining a best-fit audio translation of spoken words.

BACKGROUND

There is a need for improved systems and methods to accurately match and dub word translations of an actor speaking in a video.

SUMMARY

The present invention provides a method, and associated computer system and computer program product, for converting a first language of a soundtrack of a person speaking in a video to a second language. The method defines an outline of a shape of a mouth opening of the person speaking a syllable of a word of the first language in the video at a given start time by selecting a predetermined number of points along a border of the mouth opening defined by the lips. A length of the spoken syllable is also measured and one or more adjacent syllables are combined to create a word. The word is translated into synonym words in the second language, the best fit synonym word is selected that most closely matches the mouth shape of the first language word, and a mouth shape adjustment script is applied to fine tune the mouth shape of the best fit synonym word.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 3 is a chart illustrating shapes of a person's mouth when speaking syllables of a word in a first language, and in various synonym translation words of a second language in accordance with embodiments of the present invention.

DETAILED DESCRIPTION

Figure 1:
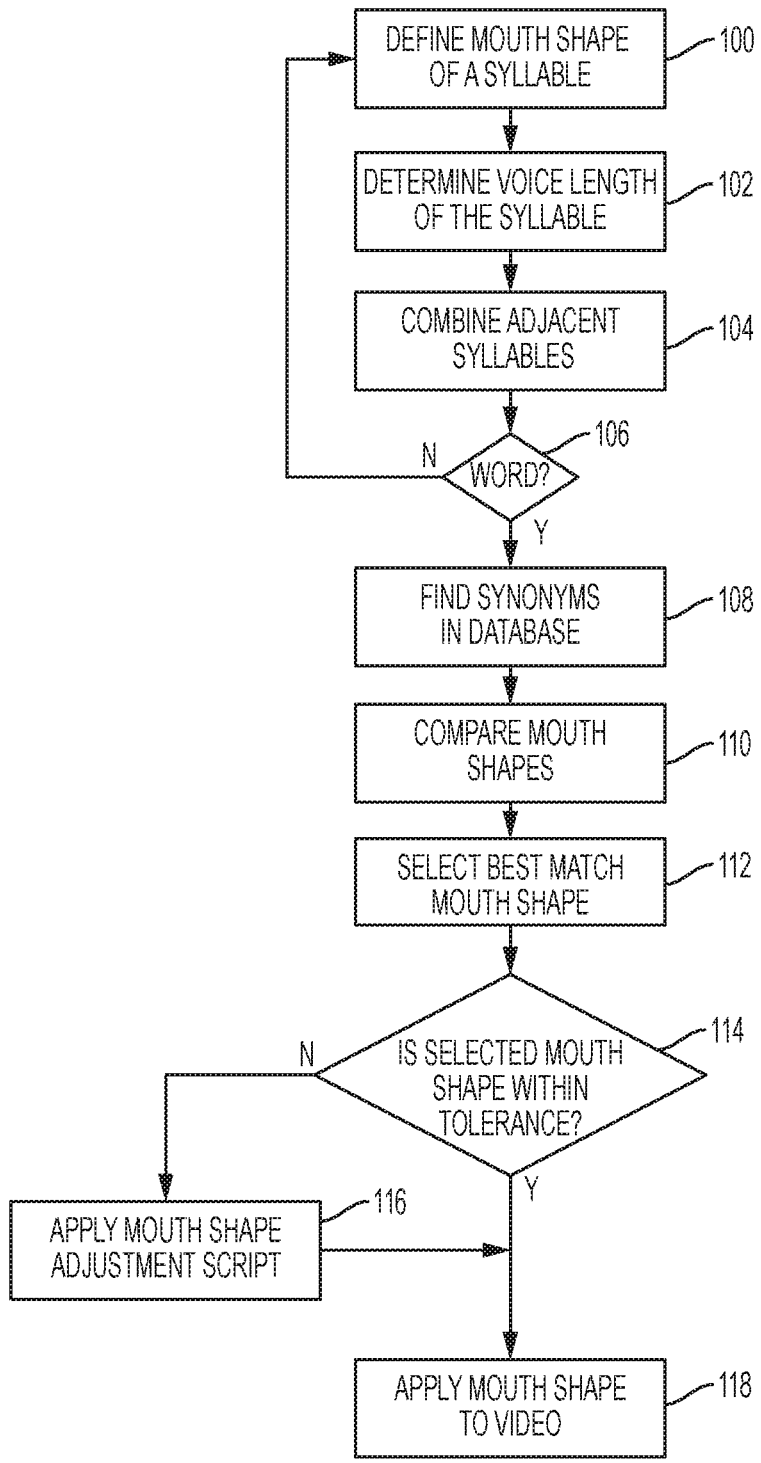
FIG. 1 is a flow chart diagram of a method of converting a first language of a soundtrack of a person speaking in a video to a second language in accordance with embodiments of the present invention.

In the following description, specific details are set forth although it should be appreciated by one of ordinary skill that the present invention can be practiced without at least some of the details. In some instances, known features or processes are not described in detail so as not to obscure the present invention.

Audio dubbing is performed to replace a soundtrack in a first language with a soundtrack in a second language when media content is released to a country using a language other than a language used in making the media content. However, in most cases when media content is translated into other languages, the mouth shape of the original actors do not match the sounds of the translated languages. This does not result in a good user experience for audiences.

Each word of a sentence in a video/film often can correspond to multiple translated words in a second language, and each syllable of each word in either language is spoken in accordance with a corresponding voice length and mouth shape. All of this data can be measured, estimated or otherwise determined and saved in a database of a computer system. According to an embodiment of the invention a translation of each word from the original spoken language of the film (hereinafter the "first language") is selected from various synonym words of the second language (hereinafter the "second language") stored in a database of the computer system. In other words, a first language film is translated into a second language.

In addition to distinguishing word meanings, each word is divided into syllables and those syllables as well as the mouth shapes and voice lengths of each syllable are stored in a database. A voice length of a syllable of a word is a measured period of time (e.g. milliseconds) between the start of a spoken syllable (identified by a first mouth shape) and the end of the spoken syllable or start of a next spoken syllable (identified by changing the first mouth shape). The start and end times are timestamped. The database includes a comprehensive collection of syllables, plus corresponding mouth shapes and voice lengths that are used in words of the database dictionary for every language to which any translation is desired.

A best match synonym word of the second language is selected from the database to match each word of the first language as spoken by a person and visually observed by the audience in the video. Criteria for a best match includes word meaning, a number of syllables of the word, mouth shapes of each syllable and voice lengths of each syllable. After the audio dubbing and translations are complete, the mouth shapes of the individual speaking in the video will closely match the translated text. The result is a lesser requirement for post-editing of mouth shapes.

Any remaining differences in the mouth shapes from the translated text can be corrected with mouth shape adjustment scripts. During a play phase of the video when a language is selected for translation, the mouth shape adjustment scripts can be utilized to fine tune a new soundtrack dynamically with the original video in real time.

The approach of the inventive methods includes: (1) Choosing a word translation which best matches an actor's original voice length and mouth shape for each syllable of the word, (2) Generate timestamped metadata of voice length and mouth shape differences for each syllable of each word being translated, (3) Leverage the generated metadata for efficient post mouth shape editing using mouth shape adjustment scripts, and (4) Deliver the mouth shape adjustment scripts for different languages to be delivered together with the original video for real time language adjustment during playing of the video.

Advantages of the methods of the invention include: (1) Producing high quality translated video content quickly with high quality mouth shape matching, (2) Reducing post-editing time, computation and requirements, (3) Providing a better user experience for soundtrack translations, and (4) Reducing the hardware requirements necessary to store data for translation into numerous different languages.

FIG. 1 is a flow chart diagram of a method of converting or translating a first language of a soundtrack of a person speaking in a video to a second language in accordance with embodiments of the present invention. In step 100 a mouth shape of a spoken syllable of a word is defined by a processor of a computer system. Specifically an outline of a shape of a mouth is defined of a person speaking a syllable of a word of the first language in the video at a given start time by selecting a predetermined number of points along a border of the mouth opening, wherein the border is a perimeter of the mouth opening defined by the lips of the person.

In this example, a person/actor in a video is speaking English which is considered to be the first language, while Chinese is considered as the second language. The word "wonderful" is to be translated from English into Chinese. The chart of FIG. 3 shows the English word "wonderful" and three corresponding synonym Chinese words labeled Translation 1, Translation2, Translation3. The mouth shapes of each of the three syllables (won-der-ful) in English and the corresponding syllables of each of the three Chinese synonym words are also depicted. In viewing the mouth shapes of FIG. 3, Chinese translation 1 appears to be the best match. Chinese translation 2 also has three syllables but the mouth shapes of the pronounced Chinese word syllables are notably different than the mouth shapes of the English word syllables. Chinese translation 3 is a single syllable word having both a different mouth shape and a different voice length than the first syllable of the English word.

Figure 4C:
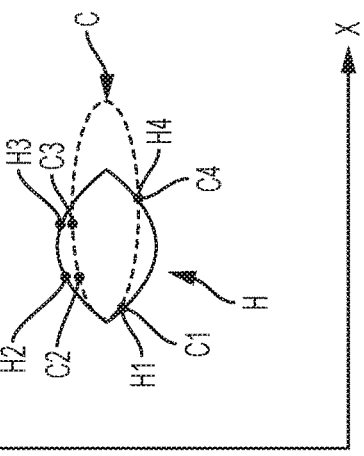
FIG. 4C is a two dimensional XY diagram of a person's mouth shape while speaking a syllable of a word in a first language superimposed with a corresponding syllable of a third synonym word in a second language in accordance with embodiments of the present invention.
Figure 4B:
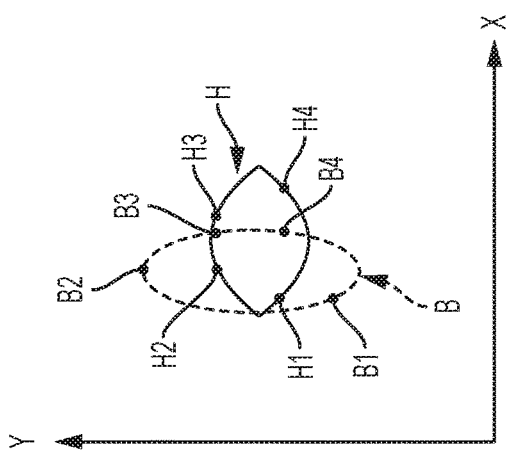
FIG. 4B is a two dimensional XY diagram of a person's mouth shape while speaking a syllable of a word in a first language superimposed with a corresponding syllable of a second synonym word in a second language in accordance with embodiments of the present invention.
Figure 4A:
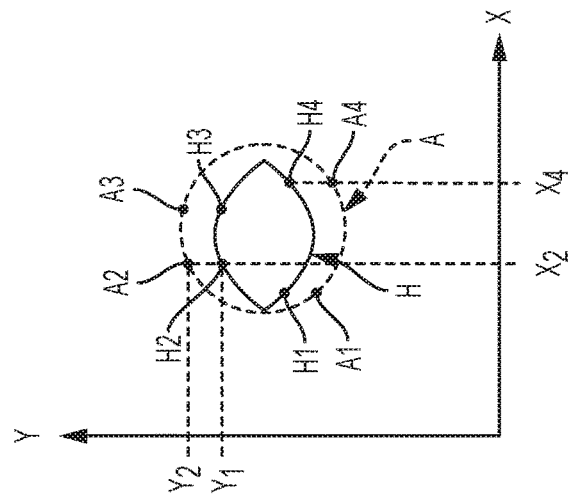
FIG. 4A is a two dimensional XY diagram of a person's mouth shape while speaking a syllable of a word in a first language superimposed with a corresponding syllable of a first synonym word in a second language in accordance with embodiments of the present invention.

Further clarification of mouth shape comparisons is evident as represented in FIGS. 4A, 4B, 4C. The border of the mouth shape of a syllable of a word in a first language is labeled H in each of the figures. Four predetermined points H1, H2, H3 and H4 are selected along the border H to define the mouth shape which is estimated by known approximation methods such as interpolation. In the mathematical field of numerical analysis, interpolation is a well known method of constructing new data points within the range of a discrete set of known data points such as the four predetermined points H1, H2, H3 and H4 of FIGS. 4A, 4B, 4C. Interpolation is used to interpolate/estimate the value of a function representing the curve H to fill in the points of the curve, by way of curve fitting, between the four predetermined points.

FIGS. 4A, 4B and 4C are each two dimensional XY diagrams of a person's mouth shape, i.e. mouth perimeter, H defined by points H1, H2, H3, H4 while a person speaks a syllable of a word in a first language. Superimposed over the spoken mouth shapes H are mouth shapes A, B, C in FIGS. 4A, 4B, 4C respectively which correspond to mouth shapes of syllables of synonym words in the second language to the word being translated from the first language. The mouth shape of syllable A is determined by points A1, A2, A3, A4; the mouth shape of syllable B is estimated and determined by points B1, B2, B3, B4; and the mouth shape of syllable C is determined by points C1, C2, C3, C4.

Once the mouth shape of a syllable of a spoken word in the first language is established, the voice length or length of the spoken syllable is determined in step 102 by measuring a time period of the person sustaining the mouth opening shape of the syllable from the given timestamped start time to an end time of the syllable. Adjacent syllables, if any, of the first language are combined in step 104. For instance, the word "hi" has but one syllable, whereas the word "hello" (hel-lo) has two syllables, and the word "wonderful" (won-der-ful) has three syllables. If the first syllable does not yield a recognized word in step 106, then the method returns to step 100 to look at the next adjacent spoken syllable. The mouth shape of the second spoken syllable is defined in step 100 and the voice length of the second syllable is determined in step 102. The first and second adjacent syllables are combined in step 104 and decision step 106 determines whether the combination results in a word. If the answer is yes, then the combined syllables create a recognized word in the first language.

Step 108 translates the word and finds synonyms of the word in a second language thesaurus database of a computer system. For example, in FIG. 3 the English word "wonderful" has three synonym Chinese word translations (Translation 1, Translation 2, Translation 3) that were retrieved from the thesaurus database.

Mouth shapes and voice lengths of the syllables of the synonym words are compared in step 110 to the mouth shapes and voice lengths of the syllables of the word being translated. A best match translated word is selected in step 112. If the best match translated word falls within a specified tolerance as determined in step 114, then in step 110 that best-fit word is applied to the soundtrack, and the mouth shapes and voice lengths of the syllables of that best-fit word are applied to the video. However, if the best match translated word does not fall within the specified tolerance in step 114, then the method continues to step 116 where a mouth shape adjustment script is applied to the mouth shapes and voice lengths of the syllables of the best match translated word to bring it into tolerance for better matching.

A defined outline of the shape of a mouth opening is represented by a closed curve. The mouth shape adjustment script can apply a normalization, equalization or mathematical average of two closed curves or mouth shapes. Corresponding point values of curves plotted on an XY axis define the shapes of the mouth of a person speaking in either the first language or the second language. In other words according to a mouth shape adjustment script, an average value between a point on the mouth shape curve of the spoken first language, and a corresponding point on the mouth shape curve of the closest synonym syllable or word in the second language can be realized as a compromise on selection of points (e.g. an average location between the two points as plotted on an XY axis) for the closed curve of the final mouth shape of the translation. This relationship is illustrated for example in the XY plot of FIG. 4A where $A2=(x_2, y_2)$ at point A2 of curve A (of a second language mouth shape), and $H2=(x_2, y_1)$ at point H2 curve H (of a first language mouth shape). A mouth shape adjustment script would determine the location of a point located midway between A2 and H2 as $P=(x_2, y_{ave})$ where $y_{ave}=y_2-y_1$.

Figure 2:
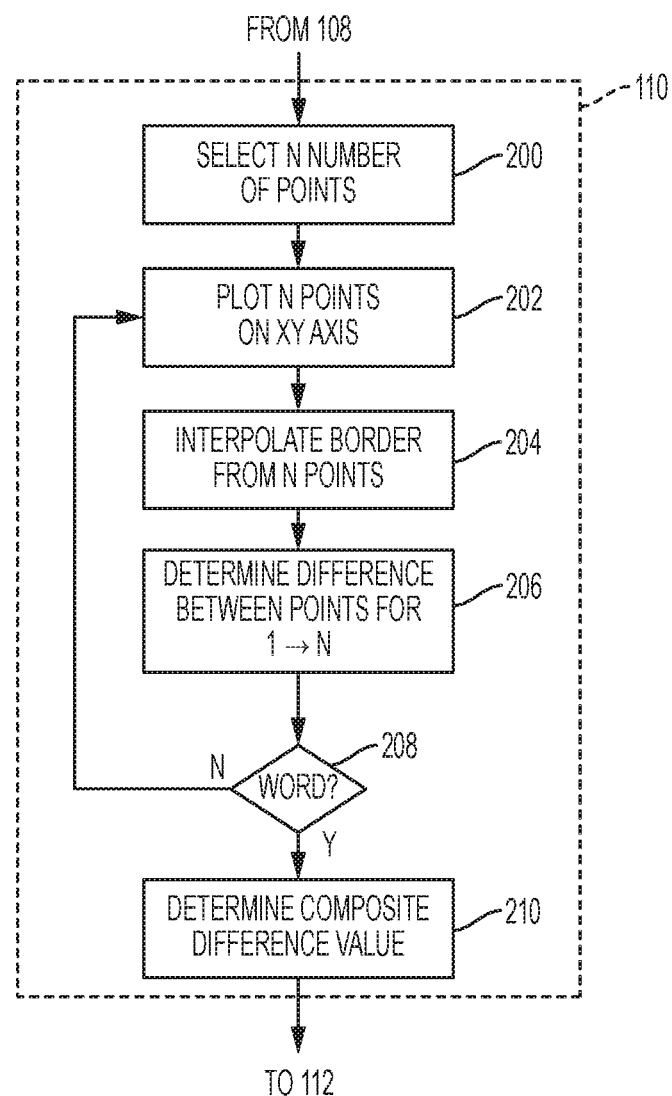
FIG. 2 is a flowchart diagram which details a comparison of measuring mouth shapes in accordance with embodiments of the present invention.

FIG. 2 is a flowchart diagram which details the comparison of measuring mouth shapes as in step 110 in accordance with embodiments of the present invention. Typically the number of points for measuring a mouth shape should be 3 or greater. The greater the number of points selected, the more accurate the mouth shape. The points are positioned along the lips to create a mouth perimeter of a person who is speaking. Thus connecting adjacent points with lines, and interpolating additional points between the predetermined points, will create a border or perimeter of the mouth opening at a given time when the person is speaking a word syllable. A number of points N for measuring a mouth shape are selected in step 200 where N≥3. Those points are plotted according to step 202 on an XY axis. For instance in FIG. 4A points H1, H2, H3, H4 are plotted/positioned along an XY axis. After interpolation of additional points between the predetermined plotted points, a closed curve is generated that provides an outline for a syllable of a word in the first language. Any well-known interpolation routine can be used in step 204 to estimate a mouth shape border such as closed curve H, using and interpolating between the predetermined points H1, H2, H3, H4.

In FIGS. 4A, 4B, 4C, a computer database of mouth shapes provides 3 synonym second language words corresponding to the first language word being translated. FIG. 4A shows the mouth shape A of a first syllable of a first synonym word which corresponds to the first language syllable H. FIG. 4B shows the mouth shape B of a first syllable of a second synonym word, and FIG. 4C shows the mouth shape C of a first syllable of a third synonym word which corresponds to the first language syllable H.

Step 206 determines the difference between each of the points 1 to N. In the example of FIG. 4A, N=4 and the differences between the corresponding points of the mouth shape of H and the mouth shape of A can be determined as $\Delta 1 = H1 - A1$, $\Delta 2 = H2 - A2$, $\Delta 3 = H3 - A3$ and $\Delta 4 = H4 - A4$. In FIG. 4B the differences between the corresponding points of the mouth shape of H and the mouth shape of B can be determined as $\Delta 1 = H1 - B1$, $\Delta 2 = H2 - B2$, $\Delta 3 = H3 - B3$ and $\Delta 4 = H4 - B4$. In FIG. 4C the differences between the corresponding points of the mouth shape of H and the mouth shape of C can be determined as $\Delta 1 = H1 - C1$, $\Delta 2 = H2 - C2$, $\Delta 3 = H3 - C3$ and $\Delta 4 = H4 - C4$.

Step 208 determines whether adjacent syllables have been combined to form a word. If a word is formed by the adjacent syllables (or if a single syllable qualifies as a word), then the method will move to step 210. Otherwise, steps 202-208 are repeated for plotting and comparing additional syllable mouth shapes. Once the method passes to step 210, a composite difference value can be determined by taking an arithmetic average of the difference values, $AVE = (\Delta 1 + \Delta 2 + \Delta 3 + \Delta 4)/4$.

In the example comparing the three syllables of the word "wonderful" for translation from English to Chinese, the average composite difference values of each of the three synonym Chinese words (e.g. Translation 1, Translation2, Translation3 in FIG. 3) is determined. For each translated word, $\Delta 1$ is a syllable difference value of a first syllable, $\Delta 2$ is a syllable difference value of a second syllable, and $\Delta 3$ is a syllable difference value of a third syllable. Each of the syllable difference values is determined mathematically using measurements, predetermined data, stored data and approximated data.

The composite difference value of the first synonym Chinese word Translation 1 is determined in step 210 as $AVE1 = (\Delta 1 + \Delta 2 + 66\ 3)/3 = (0.1 + 0.3 + 0.2)/3 = 0.2$. The composite difference value of the second synonym Chinese word Translation 2 is determined in step 210 as $AVE2 = (\Delta 1 + \Delta 2 + \Delta 3)/3 = (0.4 + 0.3 + 0.5)/3 = 0.4$. The composite difference value of the third synonym Chinese word Translation 3 is determined in step 210 as $AVE3 = (\Delta 1 + \Delta 2 + \Delta 3)/3 = (0.4 + 1.0 + 1.0)/3 = 0.8$. Since Translation 3 does not include 2nd or 3rd syllables as required in the word being translated, those syllables are each assigned a maximum difference value of 1.0. Of course, different measurement scales and ranges can be utilized. The best mouth shape match is selected in step 112 of FIG. 1 corresponding with Translation 1 having the synonym word for translation with the smallest composite difference value of 0.2.

In a similar example as above regarding FIG. 3, the composite difference values can be determined by summing the syllable difference values of each synonym word. In this case $AVE1 = \Delta 1 + \Delta 2 + \Delta 3 = 0.1 + 0.3 + 0.2 = 0.6$, $AVE2 = \Delta 1 + \Delta 2 + \Delta 3 = 0.4 + 0.3 + 0.5 = 1.2$, and $AVE1 = \Delta 1 + \Delta 2 + \Delta 3 = 0.4 + 1.0 + 1.0 = 2.4$. The best mouth shape match corresponding with the smallest composite difference value is again Translation 1 having a summed value of 0.6. Other known methods of differentiating the corresponding mouth shape curves could be applied.

Figure 5:
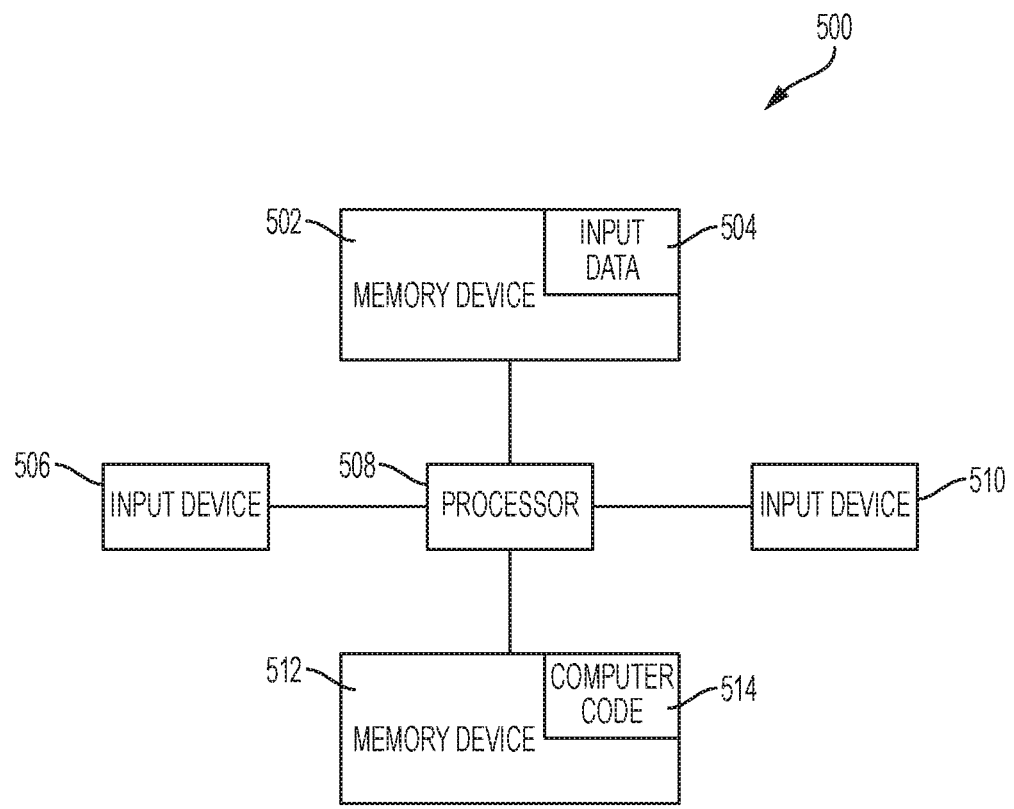
FIG. 5 illustrates an embodiment of a computer system used for implementing the methods of the present invention.

FIG. 5 illustrates an embodiment of a computer system used for implementing the methods of the present invention. The computer system 500 includes a processor 508, an input device 506 coupled to the processor 508, an output device 510 coupled to the processor 508, and memory devices 502 and 512 each coupled to the processor 508. The input device 506 may be, inter alia, a keyboard, a mouse, etc. The output device 510 may be, inter alia, a printer, a plotter, a computer screen, a magnetic tape, a removable hard disk, a floppy disk, etc. The memory devices 502 and 512 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 512 includes a computer code 514 which is a computer program that includes computer-executable instructions. The computer code 514 includes software or program instructions that may implement an algorithm for implementing methods of the present invention. The processor 508 executes the computer code 514. The memory device 502 includes input data 504. The input data 504 includes input required by the computer code 514. The output device 510 displays output from the computer code 514. Either or both memory devices 502 and 512 (or one or more additional memory devices not shown) may be used as a computer usable storage medium (or program storage device) having a computer readable program embodied therein and/or having other data stored therein, wherein the computer readable program includes the computer code 514. Generally, a computer program product (or, alternately, an article of manufacture) of the computer system/device 500 may include the computer usable storage medium (or said program storage device). The processor 508 may represent one or more processors. The memory device 502 and/or the memory device 512 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternate implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of converting a first language of a soundtrack of a person speaking in a video to a second language, said method comprising:

defining, by one or more processors of a computer system, outlines of shapes of mouth openings of the person speaking syllables of a word of the first language in the video;

translating, by the one or more processors of the computer system, a meaning of the word of the first language and locating one or more synonym words in the second language stored in a database of the computer system, said first and second languages being different languages;

comparing, by the one or more processors, outlines of the shapes of mouth openings of the one or more synonym words in the second language with the outlines of the shapes of mouth openings of the word of the first language; and selecting, by the one or more processors, a synonym word of the one or more synonym words translated from the second language into the first language having mouth openings with a smallest difference from the mouth openings of the word of the first language.

2. The method of claim 1, said method further comprising:

defining, by the one or more processors, the outlines of shapes of mouth openings of the person speaking syllables of the word of the first language in the video at given start times by selecting a predetermined number of points along a border of the mouth openings, said border defined by lips of the person;

determining, by the one or more processors, a length of spoken syllables by measuring time periods of the person sustaining the mouth openings of the syllables from the given start times to end times for the word;

translating, by the one or more processors, a meaning of the word of the first language and locating the one or more synonym words in the second language stored in a database of the computer system;

generating, by the one or more processors, numerical syllable difference values by comparing the defined outlines of the shapes of the mouth openings of the syllables of the word in the first language to respective outlines of the shapes of mouth openings of syllables of corresponding one or more synonym words in the second language, wherein the one or more translated synonym words, corresponding syllables and outlines of the shapes of mouth openings are accessed from the database of the computer system;

determining, by the one or more processors, a composite difference value between the word of the first language and each of the one or more synonym words in the second language by comparing the numerical syllable difference values of each of the syllables in the word of the first language and the one or more translated synonym words; and selecting from the database of the computer system, by the one or more processors, a selected translated synonym word of the one or more translated synonym words having a smallest said composite difference value.

3. The method of claim 2, said method further comprising:

applying, by the one or more processors, a mouth shape adjustment script to modify shapes of mouth openings of the syllables of the selected synonym word upon determining that the smallest said composite difference value is greater than a given threshold value.

4. The method of claim 3, wherein the mouth shape adjustment script determines: first closed curves representing the outlines of shapes of the mouth openings of the person speaking syllables of the word of the first language; second closed curves representing outlines of syllables of the selected translated synonym word; and average closed curves representing optimal shapes of mouth openings obtained by averaging points of the respective first closed curves and second closed curves.

5. The method of claim 4, said method further comprising editing, by the one or more processors, the soundtrack of the video into the second language by:

applying the syllables of the selected translated synonym word to the edited soundtrack of the video; and applying the corresponding shapes of mouth openings of the syllables of the selected translated synonym word to the edited soundtrack of the video.

6. The method of claim 5, said method further comprising: editing, by the one or more processors, the soundtrack of the video by replacing the word of the first language with the selected translated synonym word and replacing the shapes of mouth openings of the person speaking the syllables of the first language with corresponding optimal shapes of mouth openings of syllables of the selected translated synonym word.

7. The method of claim 1, wherein the smallest difference ranges from 0.0 signifying no difference to 1.0 signifying a maximum difference between the defined outlines of the shapes of the mouth openings of each syllable of the word of the first language with respective outline shapes of each syllable of the selected translated synonym word.

8. A computer program product, comprising one or more computer readable hardware storage devices having computer readable program code stored therein, said program code containing instructions executable by one or more processors of a computer system to implement a method of converting a first language of a soundtrack of a person speaking in a video to a second language, said method comprising:

defining, by the one or more processors, outlines of shapes of mouth openings of the person speaking syllables of a word of the first language in the video;

translating, by the one or more processors of the computer system, a meaning of the word of the first language and locating one or more synonym words in the second language stored in a database of the computer system said first and second languages being different languages;

comparing, by the one or more processors, outlines of the shapes of mouth openings of the one or more synonym words in the second language with the outlines of the shapes of mouth openings of the word of the first language; and selecting, by the one or more processors, a synonym word of the one or more synonym words translated from the second language into the first language having mouth openings with a smallest difference from the mouth openings of the word of the first language.

9. The computer program product of claim 8, said method further comprising:

defining, by the one or more processors, the outlines of shapes of mouth openings of the person speaking syllables of the word of the first language in the video at given start times by selecting a predetermined number of points along a border of the mouth openings, said border defined by lips of the person;

determining, by the one or more processors, a length of spoken syllables by measuring time periods of the person sustaining the mouth openings of the syllables from the given start times to end times for the word;

translating, by the one or more processors, a meaning of the word of the first language and locating the one or more synonym words in the second language stored in a database of the computer system;

generating, by the one or more processors, numerical syllable difference values by comparing the defined outlines of the shapes of the mouth openings of the syllables of the word in the first language to respective outlines of the shapes of mouth openings of syllables of corresponding one or more synonym words in the second language, wherein the one or more translated synonym words, corresponding syllables and outlines of the shapes of mouth openings are accessed from the database of the computer system;

determining, by the one or more processors, a composite difference value between the word of the first language and each of the one or more synonym words in the second language by comparing the numerical syllable difference values of each of the syllables in the word of the first language and the one or more translated synonym words; and selecting from the database of the computer system, by the one or more processors, a selected translated synonym word of the one or more translated synonym words having a smallest said composite difference value.

10. The computer program product of claim 9, said method further comprising:

applying, by the one or more processors, a mouth shape adjustment script to modify shapes of mouth openings of the syllables of the selected synonym word upon determining that the smallest said composite difference value is greater than a given threshold value.

11. The computer program product of claim 10, wherein, the mouth shape adjustment script determines: first closed curves representing the outlines of shapes of the mouth openings of the person speaking syllables of the word of the first language; second closed curves representing outlines of syllables of the selected translated synonym word; and average closed curves representing optimal shapes of mouth openings obtained by averaging points of the respective first closed curves and second closed curves.

12. The computer program product of claim 11, said method further comprising editing, by the one or more processors, the soundtrack of the video into the second language by:

applying the syllables of the selected translated synonym word to the edited soundtrack of the video; and applying the corresponding shapes of mouth openings of the syllables of the selected translated synonym word to the edited soundtrack of the video.

13. The computer program product of claim 12, said method further comprising: editing, by the one or more processors, the soundtrack of the video by replacing the word of the first language with the selected translated synonym word and replacing the shapes of mouth openings of the person speaking syllables of the first language with corresponding optimal shapes of mouth openings of syllables of the selected translated synonym word.

14. The computer program product of claim 8, wherein the smallest difference ranges from 0.0 signifying no difference to 1.0 signifying a maximum difference between the defined outlines of the shapes of the mouth openings of each syllable of the word of the first language with respective outline shapes of each syllable of the selected translated synonym word.

15. A system, comprising one or more processors, one or more memories, and one or more computer readable hardware storage devices, said one or more hardware storage devices containing program code executable by the one or more processors via the one or more memories to implement a method of converting a first language of a soundtrack of a person speaking in a video to a second language, said method comprising:

defining, by the one or more processors, outlines of shapes of mouth openings of the person speaking syllables of a word of the first language in the video;

translating, by the one or more processors of the computer system, a meaning of the word of the first language and locating one or more synonym words in the second language stored in a database of the computer system said first and second languages being different languages;

comparing, by the one or more processors, outlines of the shapes of mouth openings of the one or more synonym words in the second language with the outlines of the shapes of mouth openings of the word of the first language; and selecting, by the one or more processors, a synonym word of the one or more synonym words translated from the second language into the first language having mouth openings with a smallest difference from the mouth openings of the word of the first language.

16. The system of claim 15, said method further comprising:

defining, by the one or more processors, the outlines of shapes of mouth openings of the person speaking syllables of the word of the first language in the video at given start times by selecting a predetermined number of points along a border of the mouth openings, said border defined by lips of the person;

determining, by the one or more processors, a length of spoken syllables by measuring time periods of the person sustaining the mouth openings of the syllables from the given start times to end times for the word;

translating, by the one or more processors, a meaning of the word of the first language and locating the one or more synonym words in the second language stored in a database of the computer system;

generating, by the one or more processors, numerical syllable difference values by comparing the defined outlines of the shapes of the mouth openings of the syllables of the word in the first language to respective outlines of the shapes of mouth openings of syllables of corresponding one or more synonym words in the second language, wherein the one or more translated synonym words, corresponding syllables and outlines of the shapes of mouth openings are accessed from the database of the computer system;

determining, by the one or more processors, a composite difference value between the word of the first language and each of the one or more synonym words in the second language by comparing the numerical syllable difference values of each of the syllables in the word of the first language and the one or more translated synonym words; and selecting from the database of the computer system, by the one or more processors, a selected translated synonym word of the one or more translated synonym words having a smallest said composite difference value.

17. The system of claim 16, said method further comprising:
   applying, by the one or more processors, a mouth shape adjustment script to modify shapes of mouth openings of the syllables of the selected synonym word upon determining that the smallest said composite difference value is greater than a given threshold value.

18. The system of claim 17, wherein the mouth shape adjustment script determines: first closed curves representing the outlines of shapes of the mouth openings of the person speaking syllables of the word of the first language; second closed curves representing outlines of syllables of the selected translated synonym word; and average closed curves representing optimal shapes of mouth openings obtained by averaging points of the respective first closed curves and second closed curves.

19. The system of claim 18, said method further comprising editing, by the one or more processors, the soundtrack of the video into the second language by:
   applying the syllables of the selected translated synonym word to the edited soundtrack of the video; and
   applying the corresponding shapes of mouth openings of the syllables of the selected translated synonym word to the edited soundtrack of the video.

20. The system of claim 15, said method further comprising: editing, by the one or more processors, the soundtrack of the video by replacing the word of the first language with the selected translated synonym word and replacing the shapes of mouth openings of the person speaking the syllables of the first language with corresponding optimal shapes of mouth openings of syllables of the selected slated synonym word.

\* \* \* \* \*